United States Patent [19]

Ogawa

[11] Patent Number: 4,508,434
[45] Date of Patent: Apr. 2, 1985

[54] BRIGHT MEDIUM-RANGE TELEPHOTO LENS

[75] Inventor: Ryota Ogawa, Tokyo, Japan

[73] Assignee: Asahi Kogaku Kogyo Kabushiki Kaisha, Tokyo, Japan

[21] Appl. No.: 531,570

[22] Filed: Sep. 13, 1983

[51] Int. Cl.³ .......................... G02B 9/62; G02B 13/02
[52] U.S. Cl. ...................................... 350/454; 350/464
[58] Field of Search ................................ 350/454, 464

[56] References Cited

U.S. PATENT DOCUMENTS 3,948,584  4/1976  Basista et al. ........................ 350/454

Primary Examiner—John K. Corbin
Assistant Examiner—Rebecca D. Gass
Attorney, Agent, or Firm—Sughrue, Mion, Zinn, Macpeak & Seas

[57] ABSTRACT

A bright medium-range telephoto lens comprises, in order from an object, a first positive lens having a stronger positive power toward the object, a second positive-meniscus lens having a stronger positive power toward the object, a third negative-meniscus lens having a stronger negative power toward an image, a compound lens spaced from the third lens with an aperture interposed therebetween and having a fourth negative lens having a stronger negative power toward the object and a fifth positive lens having a stronger positive power toward the image, a sixth positive lens, and a seventh positive lens having a weak power.

5 Claims, 12 Drawing Figures

BRIGHT MEDIUM-RANGE TELEPHOTO LENS

BACKGROUND OF THE INVENTION

The present invention relates to a bright medium-range telephoto lens suitable for use in taking portraits, and more particularly to a photographic lens system having an F number up to 1:1.4 with spherical aberration and astigmatism corrected sufficiently for coverage ranging from objects at an infinite distance to those at a closest distance.

Medium-range telephoto lenses having an F number of 1:1.4 and a focal length of 85 mm are widely used in taking portraits. However, it is difficult for prior medium-range telephoto lenses to correct aberrations over a full image height within the depth at the brightness of 1.4. In particular, where the sagittal curvature of field is too small for assuring performance at an outermost peripheral edge of the field, the lens system tends to suffer from shortcomings in that astigmatism is increased in medium angles of view and images cannot be well focused, resulting in images having blurred profiles in portraits.

SUMMARY OF THE INVENTION

With the foregoing prior drawbacks in view, it is an object of the present invention to provide a bright medium-range telephoto lens having a front-group focusing system in which a sagittal contrast in medium angles of view is maintained on a central focus plane, an under amount of spherical aberration is reduced for keeping performance in balance at an outermost peripheral edge of the field, a marginal ray of light which would tend to be overly admitted by the under amount of spherical aberration is reduced sufficiently, a high contrast is achieved at a reduced depth on a focused plane, and images are highly blurred at out-of-focus points, these properties being kept in the full range of magnifications used.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
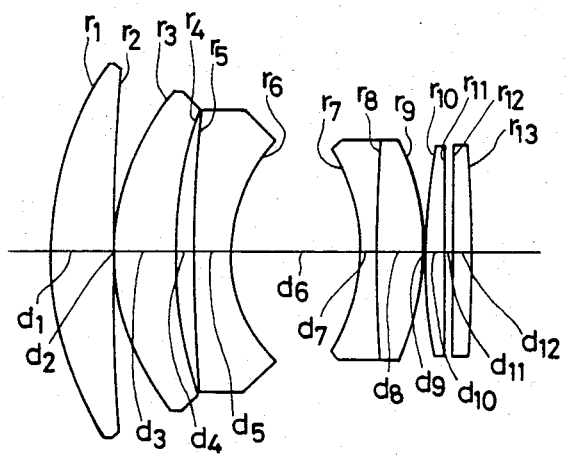
FIGS. 1, 5 and 9 are views showing lenses according to Examples 1, 2 and 3, respectively, the lenses being in a mode of focusing an object at an infinite distance.
Figure 2:
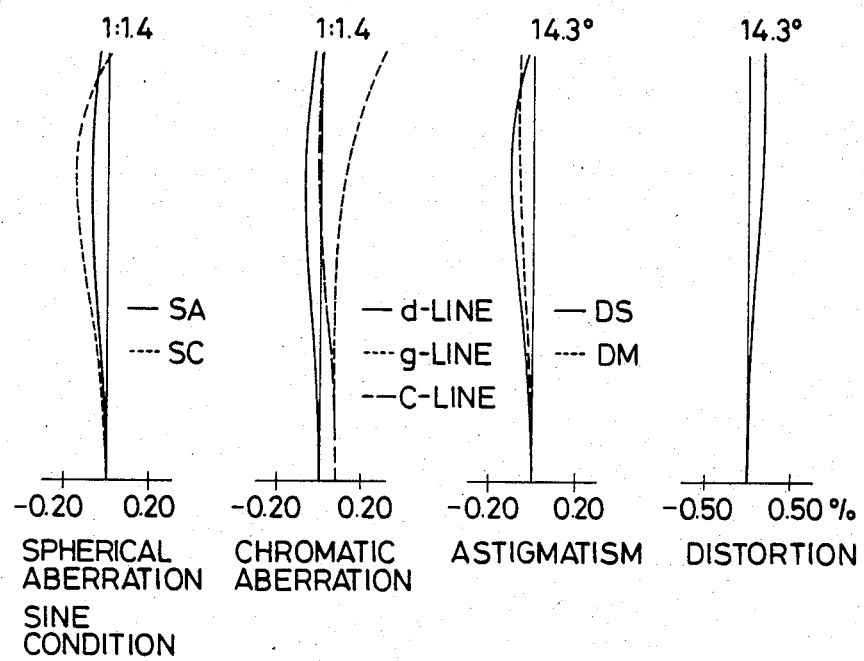
FIGS. 2, 6 and 10 are diagrams illustrating aberrations of the lenses shown in FIGS. 1, 5 and 9, respectively.
Figure 3:
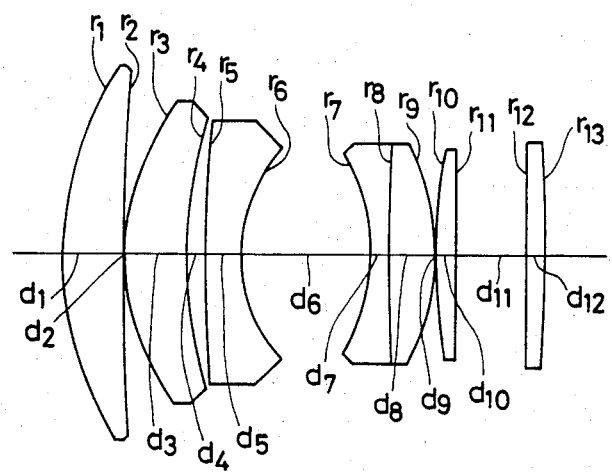
FIGS. 3, 7 and 11 are views showing the lenses according to Examples 1, 2 and 3, rspectively, the lenses being in a mode of focusing an object in a range of from a finite distance to 0.1 magnification.
Figure 4:
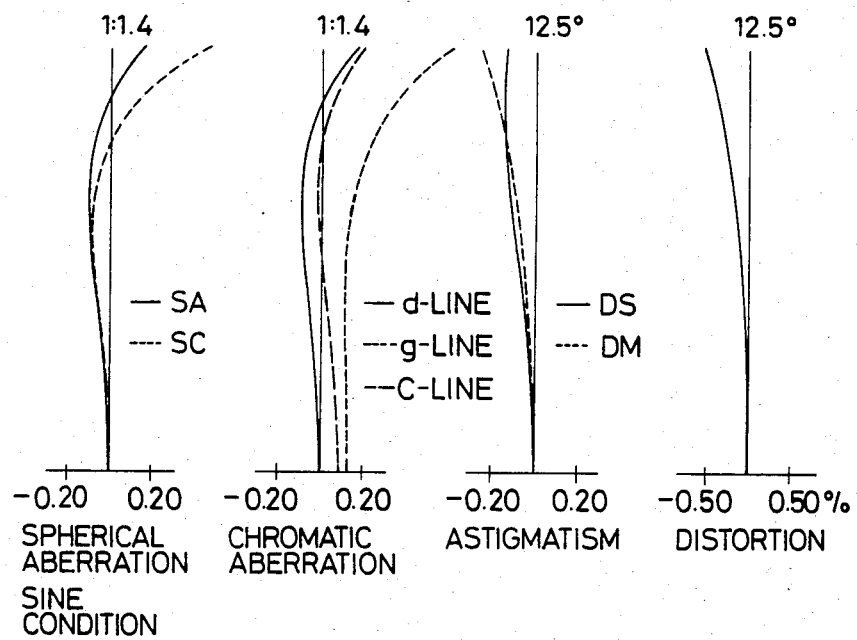
FIGS. 4, 8 and 12 are diagrams illustrating aberrations of the lenses shown in FIGS. 3, 7 and 11, respectively.
Figure 5:
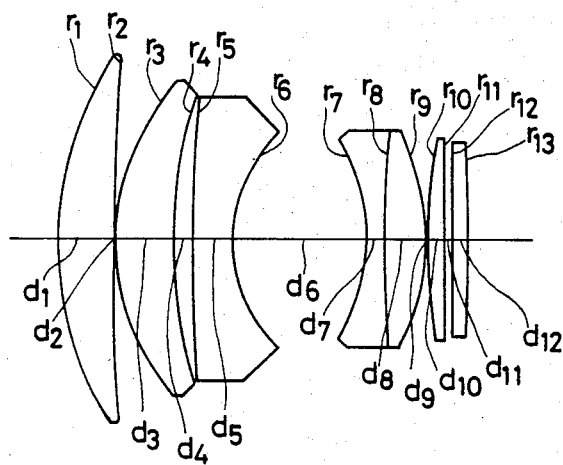
Figure 6:
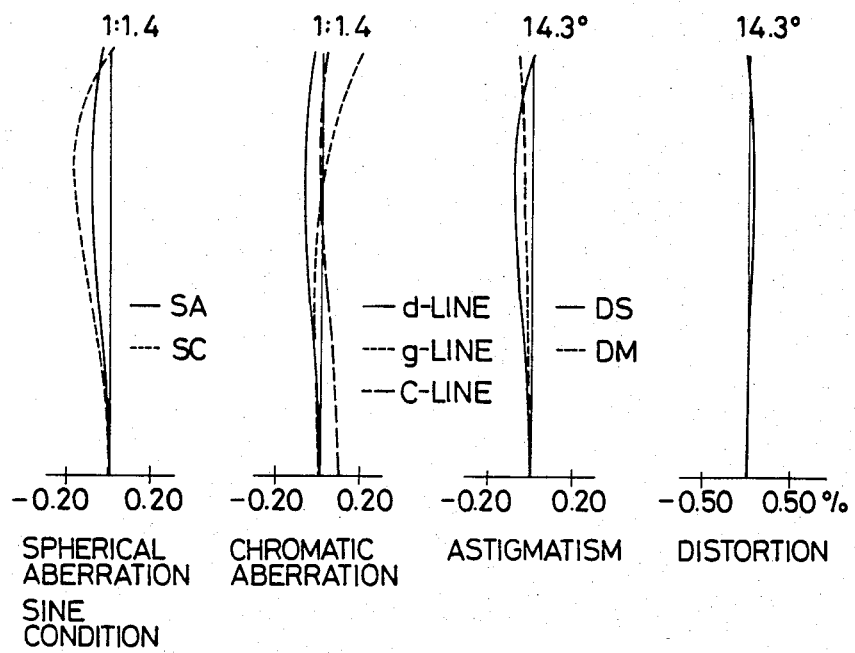
Figure 7:
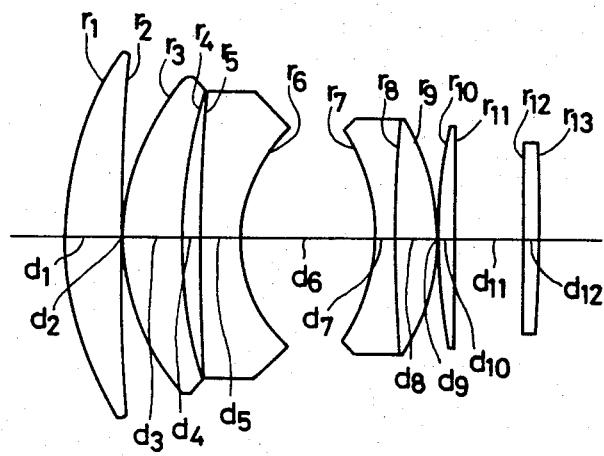
Figure 8:
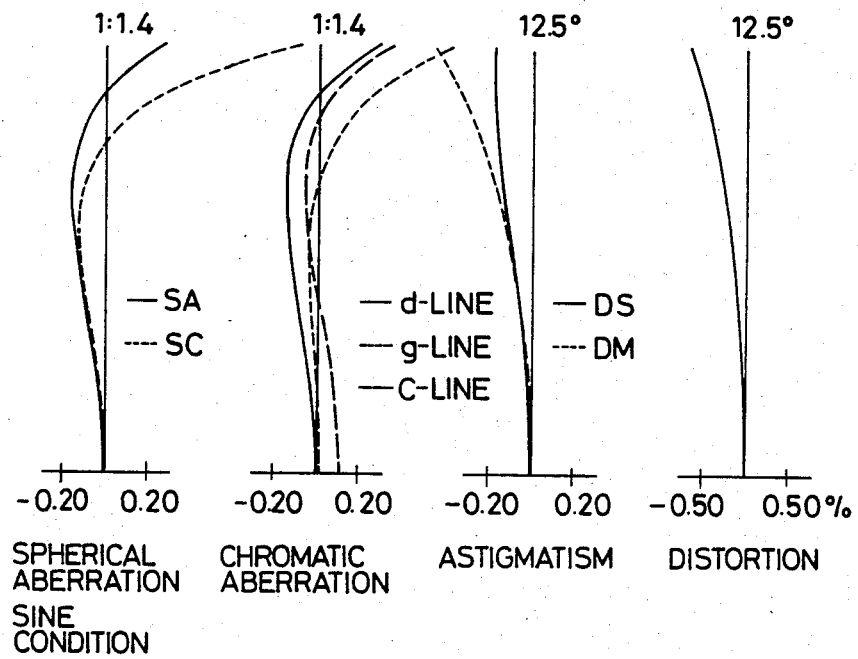
Figure 9:
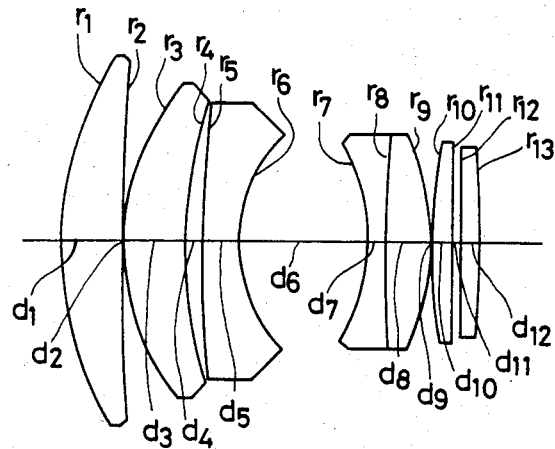
Figure 10:
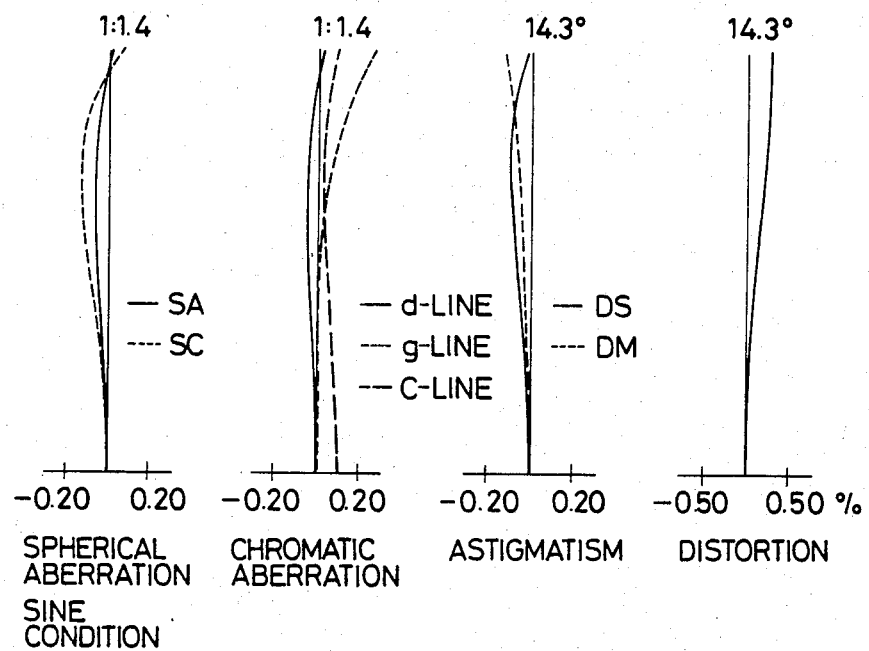
Figure 11:
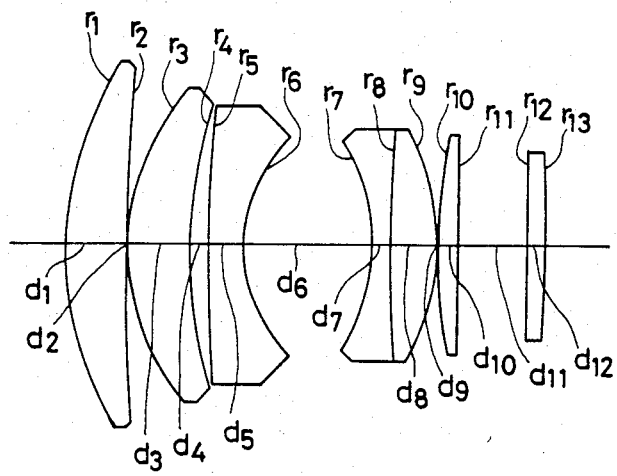
Figure 12:
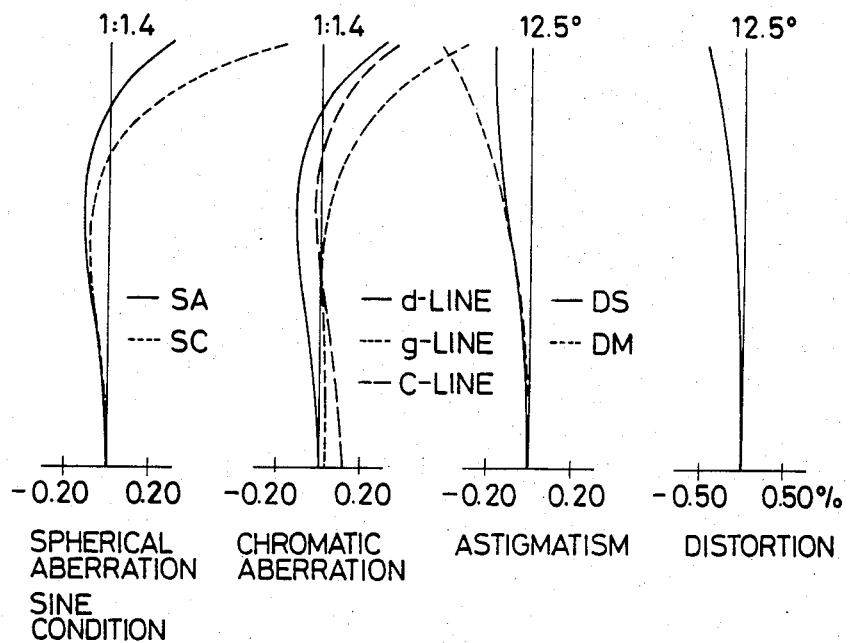

According to the present invention, a bright medium-range telephoto lens comprises, in order from an object, a first positive lens having a stronger positive power toward the object, a second positive-meniscus lens having a stronger positive power toward the object, a third negative-meniscus lens having a stronger negative power toward an image, a compound lens spaced from the third lens with an aperture interposed therebetween and having a fourth negative lens having a stronger negative power toward the object and a fifth positive lens having a stronger positive power toward the image, a sixth positive lens, and a seventh positive lens having a weak power. The bright medium-range telephoto lens satisfies the following conditions:

$$1.65 < (n_1 + n_2)/2 < 1.8 \quad (1)$$
$$50 < (\nu_1 + \nu_2)/2 \quad (2)$$
$$0.8 < f/f_{1,2} < 1.2 \quad (3)$$
$$1.65 < f/f_{1,4} < 1.95 \quad (4)$$
$$0.4f < r_3 < 0.55f \quad (5)$$

$$-0.65 < \left( \frac{n_3 - 1}{r_5} - \frac{n_2 - 1}{r_4} \right) f < -0.35 \quad (6)$$

$$0.35 < f/f_{1,6} < 0.55 \quad (7)$$
$$1.65 < n_3 < 1.8 \quad (8)$$
$$\nu_3 < 35 \quad (9)$$
$$0.25f < d_1 + d_2 + d_3 + d_4 + d_5 < 0.4f \quad (10)$$
$$0.2f < d_6 < 0.3f \quad (11)$$
$$0.1 < n_5 - n_4 \quad (12)$$
$$0.09f < d_7 + d_8 < 0.15f \quad (13)$$
$$0.05f < r_7 - r_9 < 0.12f \quad (14)$$
$$5 < \nu_5 - \nu_4 < 15 \quad (15)$$
$$0.45 < f/f_{1,9} < 0.65 \quad (16)$$
$$0.85 < f/f_{1,11} < 0.95 \quad (17)$$

where
- $r_i$: the radius of curvature of the ith surface,
- $d_i$: the thickness of inter-lens distance of the ith lens,
- $n_i$: the refractive index of the ith lens at d-line,
- $\nu_i$: the Abbe number of the ith lens, and
- $f_{1,i}$: the focal length from the first surface to the ith surface.

The above conditions will be described.

The conditions (1) through (10) are imposed on the front lens group ahead of the aperture. If the lower limit of the condition (1) were exceeded, then the powers of the surfaces of the positive lens in the front lens group would become too strong, and if the upper limit were exceeded, then the curvature of field would be overly increased.

The condition (2) is related to chromatic aberration and is effective in allowing the third negative lens to meet the conditions (8), (9) and reducing the chromatic aberration of the front lens group.

The conditions (3), (4) are indicative of power distribution on the first lens and from the first lens to the second lens. These conditions are necessary for enabling the first lens to have a power substantially equal to the focal length of the overall lens system, for enabling up to the second lens to have a power exceeding the focal length of the overall lens system, for appropriately determining the sizes of the following lens elements, and maintaining good various aberrations including the Petzval sum of the overall system. The lower limits indicate a limitation of poor aberrations due to strong lens surfaces. If the upper limits were exceeded, then light rays would tend to be spread and the following negative lens system would be larger in size with the radius of curvature thereof being difficult to determine in a good aberration range.

The condition (5) is effective, in association with the condition (4), in keeping spherical aberration small while maintaining the power up to the second lens. As an indirect result, the condition (5) cooperates with the condition (6) in reducing distortion due to $r_4$ to a small value. The condition (6) shows the sum of powers of the fourth and fifth surfaces, and is important in reducing spherical aberration in the front lens group and keeping astigmatism and coma well in balance in the front lens group.

The condition (7) serves to make the focal length of the front lens group about twice the focal length of the overall lens system. If the lower limit were exceeded, then spherical aberration and coma would become worse due to stronger $r_6$. If the upper limit were exceeded, then the burden on the power of the fourth lens toward the object would be excessively large since the height of a marginal light ray on the image would be increased in order to cause the rear surface of the compound lens of the four and fifth lenses in the rear lens group to work properly as a stopper of spherical aberration.

The conditions (8), (9) are imposed on the third lens, and are required to keep a proper Petzval sum while correcting chromatic aberration in the front lens group and to select the radius of curvature of the sixth furface properly under the condition (7).

The condition (10) is a condition for the length of the front lens group, and is effective in normalizing a lowering of the marginal light ray in the front lens group and in satisfying the conditions (1) through (9) effectively to balance various aberrations in the front lens group. If the upper limit were exceeded, then the height of the marginal light ray in the front lens group would be excessively changed, causing aberrations in the front lens group to go worse. If the lower limit were exceeded, then the height of the marginal light ray in the rear lens group would be excessively increased, with the result that the Petzval sum would not be sufficiently corrected and the burden on the rear lens group would become large.

The condition (11), which governs the distance between the front and rear lens groups, is necessary to hold spherical aberration and coma to a suitable extent while maintaining an amount of light which is basically needed.

The conditions (12) through (15) are effective with respect to the compound lens of the fourth and fifth lenses. The conditions (12), (13) and (14) are effective in shaping spherical aberration well by balancing refractive powers of $r_7$, $r_9$. Outside the range given by the condition (12), the radius of curvature $r_9$ would be increased, and also so would be if the upper limit of the contition (13) and the lower limit of the condition (14) were exceeded. If the lower limit of the condition (13) and the upper limit of the condition (14) were exceeded, then the stopper of spherical aberration would be less effective. The condition (15) is effective in correcting chromatic aberration in the front lens group, and cooperates with the conditions (2), (9) in holding down an asymmetrical chromatic aberration such as chromatic aberration of magnification.

The condition (16) is incidental to the conditions (12), (13), (14). If the lower limit of the condition (16) were exceeded, then the following positive lens would be subjected to an increased burden, and not only aberrations would become worse but also variations in aberrations would be increased on focusing. If the upper limit were exceeded, then spherical aberrations would fail to be well shaped.

The condition (17) is effective in reducing variations at close distances in aberrations in the lens system in which the first through sixth lenses, with the seventh lens excluded, are employed in unison for focusing while allowing up to the sixth lens to have about 90% of the power of the entire lens system.

More preferably, the above described conditions (1) to (17) are further limited as follows:

$1.65 < (n_1 + n_2)/2 < 1.78$ (1')
$50 < (\nu_1 + \nu_2)/2$ (2')
$0.85 < f/f_{1,2} < 1.15$ (3')
$1.7 < f/f_{1,4} < 1.9$ (4')
$0.42f < r_3 < 0.53f$ (5')

$$-0.60 < \left( \frac{n_3 - 1}{r_5} - \frac{n_2 - 1}{r_4} \right) f < -0.40 \quad (6')$$

$0.38f < f/f_{1,6} < 0.52f$ (7')
$1.65 < n_3 < 1.80$ (8')
$\nu_3 < 33$ (9')
$0.27f < d_1 + d_2 + d_3 + d_4 + d_5 < 0.4f$ (10')
$0.22f < d_6 < 0.29f$ (11')
$0.1 < n_5 - n_4$ (12')
$0.09f < d_7 + d_8 < 0.15f$ (13')
$0.05f < r_7 - r_9 < 0.12f$ (14')
$5 < \nu_5 - \nu_4 < 15$ (15')
$0.45 < f/f_{1,9} < 0.65$ (16')
$0.85 < f/f_{1,11} < 0.95$ (17')

Examples 1 through 3 will be described hereinbelow. Designated at r is the radius of curvature, d the lens thickness or inter-lens distance, n the refractive index at d-line, $\nu$ the Abbe number, f and $\omega$ are the focal length and half angle of view, respectively, when the object is at an infinite distance, and $f_B$ the back focus.

EXAMPLE 1

| No. | 1:1.4 f = 84.91 r | $\omega$ = 14.3° d | $f_B$ = 39.89 n | $\nu$ |
|---|---|---|---|---|
| 1 | 55.762 | 10.38 | 1.72916 | 54.7 |
| 2 | 571.681 | 0.15 | | |
| 3 | 40.623 | 10.15 | 1.72916 | 54.7 |
| 4 | 75.873 | 2.93 | | |
| 5 | 226.050 | 5.93 | 1.7552 | 27.5 |
| 6 | 25.294 | 21.42 | | |
| 7 | −31.300 | 2.76 | 1.59551 | 39.2 |
| 8 | 273.800 | 7.81 | 1.77250 | 49.6 |
| 9 | −39.091 | 0.15 | | |
| 10 | 87.610 | 3.26 | 1.77250 | 49.6 |
| 11 | 1080.030 | 1.40 | | |
| 12 | 4058.633 | 3.00 | 1.72916 | 54.7 |
| 13 | −334.410 | | | |

$f/f_{1,2} = 1.010 \quad f/f_{1,4} = 1.798$ $\left( \frac{n_3 - 1}{r_5} - \frac{n_2 - 1}{r_4} \right) f = -0.532$ $f/f_{1,6} = 0.443 \quad f/f_{1,9} = 0.544$
$f/f_{1,11} = 0.906$

EXAMPLE 2

| No. | 1:1.4 f = 84.96 r | $\omega$ = 14.3° d | $f_B$ = 40.38 n | $\nu$ |
|---|---|---|---|---|
| 1 | 54.361 | 9.44 | 1.72916 | 54.7 |
| 2 | 558.468 | 0.15 | | |
| 3 | 38.904 | 9.60 | 1.64000 | 60.1 |
| 4 | 79.461 | 2.93 | | |
| 5 | 258.287 | 6.72 | 1.71736 | 29.5 |
| 6 | 24.080 | 22.39 | | |
| 7 | −30.374 | 2.79 | 1.59551 | 39.2 |
| 8 | 151.072 | 7.13 | 1.77250 | 49.6 |

-continued

| | 1:1.4 f = 84.96 ω = 14.3° $f_B$ = 40.38 | | | |
|---|---|---|---|---|
| No. | r | d | n | ν |
| 9 | −37.474 | 0.15 | | |
| 10 | 89.776 | 2.78 | 1.77250 | 49.6 |
| 11 | 1583.604 | 1.36 | | |
| 12 | ∞ | 2.59 | 1.72916 | 54.7 |
| 13 | −388.402 | | | |

$f/f_{1,2}$ = 1.037   $f/f_{1,4}$ = 1.807

$$\left(\frac{n_3-1}{r_5} - \frac{n_2-1}{r_4}\right) f = -0.448$$

$f/f_{1,6}$ = 0.425   $f/f_{1,9}$ = 0.562
$f/f_{1,11}$ = 0.925

EXAMPLE 3

| | 1:1.4 f = 84.77 ω = 14.3° $f_B$ = 39.37 | | | |
|---|---|---|---|---|
| No. | r | d | n | ν |
| 1 | 55.762 | 10.38 | 1.72916 | 54.7 |
| 2 | 571.681 | 0.15 | | |
| 3 | 39.700 | 10.15 | 1.69680 | 56.5 |
| 4 | 76.266 | 2.93 | | |
| 5 | 226.050 | 5.93 | 1.74000 | 28.3 |
| 6 | 24.898 | 21.42 | | |
| 7 | −31.300 | 2.80 | 1.59551 | 39.2 |
| 8 | 220.000 | 7.60 | 1.77250 | 49.6 |
| 9 | −39.000 | 0.15 | | |
| 10 | 87.61 | 3.26 | 1.77250 | 49.6 |
| 11 | 1188.661 | 1.4 | | |
| 12 | 4058.633 | 3.0 | 1.72916 | 54.7 |
| 13 | −374.842 | | | |

$f/f_{1,2}$ = 1.009   $f/f_{1,4}$ = 1.795

$$\left(\frac{n_3-1}{r_5} - \frac{n_2-1}{r_4}\right) f = -0.497$$

$f/f_{1,6}$ = 0.449   $f/f_{1,9}$ = 0.555
$f/f_{1,11}$ = 0.916

Although a certain preferred embodiment has been shown and described, it should be understood that many changes and modifications may be made therein without departing from the scope of the appended claim.

What is claimed is:

1. A bright medium-range telephoto lens comprising, in order from an object, a first positive lens having a stronger positive power toward the object, a second positive-meniscus lens having a stronger positive power toward the object, a third negative-meniscus lens having a stronger negative power toward an image, a compound lens spaced from the third lens with an aperture interposed therebetween and having a fourth negative lens having a stronger negative power toward the object and a fifth positive lens having a stronger positive power toward the image, a sixth positive lens, and a seventh positive lens having a weak power, the bright medium-range telephoto lens meeting the following conditions:

$1.65 < (n_1 + n_2)/2 < 1.8$ (1)
$50 < (\nu_1 + \nu_2)/2$ (2)
$0.8 < f/f_{1,2} < 1.2$ (3)
$1.65 < f/f_{1,4} < 1.95$ (4)
$0.4f < r_3 < 0.55f$ (5)

$$-0.65 < \left(\frac{n_3-1}{r_5} - \frac{n_2-1}{r_4}\right) f < -0.35 \quad (6)$$

$0.35 < f/f_{1,6} < 0.55$ (7)
$1.65 < n_3 < 1.8$ (8)
$\nu_3 < 35$ (9)
$0.25f < d_1 + d_2 + d_3 + d_4 + d_5 < 0.4f$ (10)
$0.2f < d_6 < 0.3f$ (11)
$0.1 < n_5 - n_4$ (12)
$0.09f < d_7 + d_8 < 0.15f$ (13)
$0.05f < r_7 - r_9 < 0.12f$ (14)
$5 < \nu_5 - \nu_4 < 15$ (15)
$0.45 < f/f_{1,9} < 0.65$ (16)
$0.85 < f/f_{1,11} < 0.95$ (17)

where
ri: the radius of curvature of the ith surface,
di: the thickness of inter-lens distance of the ith lens,
ni: the refractive index of the ith lens at d-line,
νi: the Abbe number of the ith lens, and
$f_{1,i}$: the focal length from the first surface to the ith surface.

2. The telephoto lens of claim 1 further meeting the following conditions:

$1.65 < (n_1 + n_2)/2 < 1.78$ (1')
$50 < (\nu_1 + \nu_2)/2$ (2')
$0.85 < f/f_{1,2} < 1.15$ (3')
$1.7 < f/f_{1,4} < 1.9$ (4')
$0.42f < r_3 < 0.53f$ (5')

$$-0.60 < \left(\frac{n_3-1}{r_5} - \frac{n_2-1}{r_4}\right) f < -0.40 \quad (6')$$

$0.38f < f/f_{1,6} < 0.52f$ (7')
$1.65 < n_3 < 1.80$ (8')
$\nu_3 < 33$ (9')
$0.27f < d_1 + d_2 + d_3 + d_4 + d_5 < 0.4f$ (10')
$0.22f < d_6 < 0.29f$ (11')
$0.1 < n_5 - n_4$ (12')
$0.09f < d_7 + d_8 < 0.15f$ (13')
$0.05f < r_7 - r_9 < 0.12f$ (14')
$5 < \nu_5 - \nu_4 < 15$ (15')
$0.45 < f/f_{1,9} < 0.65$ (16')
$0.85 < f/f_{1,11} < 0.95$ (17')

3. The telephoto lens of claim 1, further meeting the following charts:

| | 1:1.4 f = 84.91 ω = 14.3° $f_B$ = 39.89 | | | |
|---|---|---|---|---|
| No. | r | d | n | ν |
| 1 | 55.762 | 10.38 | 1.72916 | 54.7 |
| 2 | 571.681 | 0.15 | | |
| 3 | 40.623 | 10.15 | 1.72916 | 54.7 |
| 4 | 75.873 | 2.93 | | |
| 5 | 226.050 | 5.93 | 1.7552 | 27.5 |
| 6 | 25.294 | 21.42 | | |
| 7 | −31.300 | 2.76 | 1.59551 | 39.2 |
| 8 | 273.800 | 7.81 | 1.77250 | 49.6 |
| 9 | −39.091 | 0.15 | | |
| 10 | 87.610 | 3.26 | 1.77250 | 49.6 |
| 11 | 1080.030 | 1.40 | | |
| 12 | 4058.633 | 3.00 | 1.72916 | 54.7 |
| 13 | −334.410 | | | |

$f/f_{1,2}$ = 1.010   $f/f_{1,4}$ = 1.798

$$\left(\frac{n_3-1}{r_5} - \frac{n_2-1}{r_4}\right) f = -0.532$$

$f/f_{1,6}$ = 0.443   $f/f_{1,9}$ = 0.544
$f/f_{1,11}$ = 0.906 where r is the radius of curvature, d the lens thickness of inter-lens distance, n the refractive index at d-line, $\nu$ the Abbe number, f and $\omega$ are the focal length and half angle of view, respectively, when the object is at an infinite distance, and $f_B$ the back focus.

4. The telephoto lens of claim 1, further meeting the following charts:

| No. | 1:1.4 f = 84.96 ω = 14.3° $f_B$ = 40.38 | | | |
|---|---|---|---|---|
| | r | d | n | $\nu$ |
| 1 | 54.361 | 9.44 | 1.72916 | 54.7 |
| 2 | 558.468 | 0.15 | | |
| 3 | 38.904 | 9.60 | 1.64000 | 60.1 |
| 4 | 79.461 | 2.93 | | |
| 5 | 258.287 | 6.72 | 1.71736 | 29.5 |
| 6 | 24.080 | 22.39 | | |
| 7 | −30.374 | 2.79 | 1.59551 | 39.2 |
| 8 | 151.072 | 7.13 | 1.77250 | 49.6 |
| 9 | −37.474 | 0.15 | | |
| 10 | 89.776 | 2.78 | 1.77250 | 49.6 |
| 11 | 1583.604 | 1.36 | | |
| 12 | ∞ | 2.59 | 1.72916 | 54.7 |
| 13 | −388.402 | | | |

$f/f_{1,2} = 1.037 \quad f/f_{1,4} = 1.807$ $$\left( \frac{n_3 - 1}{r_5} - \frac{n_2 - 1}{r_4} \right) f = -0.448$$

$f/f_{1,6} = 0.425 \quad f/f_{1,9} = 0.562$
$f/f_{1,11} = 0.925$ where r is the radius of curvature, d the lens thickness of inter-lens distance, n the refractive index at d-line, $\nu$ the Abbe number, f and $\omega$ are the focal length and half angle of view, respectively, when the object is at an infinite distance, and $f_B$ the back focus.

5. The telephoto lens of claim 1, further meeting the following charts:

| No. | 1:1.4 f = 84.77 ω = 14.3° $f_B$ = 39.37 | | | |
|---|---|---|---|---|
| | r | d | n | $\nu$ |
| 1 | 55.762 | 10.38 | 1.72916 | 54.7 |
| 2 | 571.681 | 0.15 | | |
| 3 | 39.700 | 10.15 | 1.69680 | 56.5 |
| 4 | 76.266 | 2.93 | | |
| 5 | 226.050 | 5.93 | 1.74000 | 28.3 |
| 6 | 24.898 | 21.42 | | |
| 7 | −31.300 | 2.80 | 1.59551 | 39.2 |
| 8 | 220.000 | 7.60 | 1.77250 | 49.6 |
| 9 | −39.000 | 0.15 | | |
| 10 | 87.61 | 3.26 | 1.77250 | 49.6 |
| 11 | 1188.661 | 1.4 | | |
| 12 | 4058.633 | 3.0 | 1.72916 | 54.7 |
| 13 | −374.842 | | | |

$f/f_{1,2} = 1.009 \quad f/f_{1,4} = 1.795$ $$\left( \frac{n_3 - 1}{r_5} - \frac{n_2 - 1}{r_4} \right) f = -0.497$$

$f/f_{1,6} = 0.449 \quad f/f_{1,9} = 0.555$
$f/f_{1,11} = 0.916$ where r is the radius of curvature, d the lens thickness or inter-lens distance, n the refractive index at d-line, $\nu$ the Abbe number, f and $\omega$ are the focal length and half angle of view, respectively, when the object is at an infinite distance, and $f_B$ the back focus.

* * * * *

UNITED STATES PATENT AND TRADEMARK OFFICE
CERTIFICATE OF CORRECTION

PATENT NO. : 4,508,434
DATED : April 2, 1985
INVENTOR(S) : Ogawa

It is certified that error appears in the above-identified patent and that said Letters Patent is hereby corrected as shown below:

On the front page, please include the following:

--[30] Foreign Application Priority Date

Sep 13, 1982 [JP] Japan.....57-159280--.

Signed and Sealed this

First Day of October 1985

[SEAL]

Attest:

DONALD J. QUIGG

Attesting Officer

Commissioner of Patents and
Trademarks—Designate